United States Patent [19]

Bito et al.

[11] Patent Number: 5,360,832
[45] Date of Patent: Nov. 1, 1994

[54] HOLLOW PARTICLES OF CROSSLINKED MELAMINE RESIN HAVING A UNIFORM PARTICLE DIAMETER AND A PROCESS FOR PRODUCING THE SAME

[75] Inventors: Masami Bito, Chigasaki; Satoshi Konishi; Fumimasa Fukazawa, both of Fujisawa, all of Japan

[73] Assignee: Honen Corporation, Tokyo, Japan

[21] Appl. No.: 218,692

[22] Filed: Mar. 28, 1994

Related U.S. Application Data

[60] Continuation of Ser. No. 986,483, Dec. 7, 1992, abandoned, which is a division of Ser. No. 651,936, Feb. 7, 1991, Pat. No. 5,190,983.

[30] Foreign Application Priority Data

Feb. 19, 1990 [JP] Japan .................................. 2-37745

[51] Int. Cl.$^5$ ............................ C08J 9/32; B01J 13/02
[52] U.S. Cl. ...................................... 521/187; 521/56; 521/64; 521/78; 521/79
[58] Field of Search ...................... 521/187, 56, 64, 78, 521/79

[56] References Cited

U.S. PATENT DOCUMENTS

| | | | |
|---|---|---|---|
| 2,797,201 | 6/1957 | Veatch et al. | 521/57 |
| 3,960,583 | 6/1976 | Netting et al. | 521/58 |
| 4,264,742 | 4/1981 | Golden et al. | 521/64 |
| 4,420,442 | 12/1983 | Sands | 521/56 |
| 4,902,413 | 2/1990 | Stout et al. | 521/56 |
| 4,986,908 | 1/1991 | Stout et al. | 521/56 |

*Primary Examiner*—Morton Foelak
*Attorney, Agent, or Firm*—Oliff & Berridge

[57] ABSTRACT

A process for producing hollow particles of crosslinked melamine resin having a uniform particles diameter, said process comprising subjecting a water-soluble methyl-etherified-melamine resin precondensate to condensation reaction in the presence of a curing catalyst in an aqueous solution containing a water-soluble polymer with carboxyl groups or water-soluble copolymer of ethylenically unsaturated carboxylic acid monomer, when the reaction liquid becomes turbid, adding to the reaction mixture a substance which dissolves or swells the melamine resin, and continuing the condensation reaction, if necessary.

6 Claims, 1 Drawing Sheet

HOLLOW PARTICLES OF CROSSLINKED MELAMINE RESIN HAVING A UNIFORM PARTICLE DIAMETER AND A PROCESS FOR PRODUCING THE SAME

This is a continuation of application Ser. No. 07/986,483 filed Dec. 7, 1992, now abandoned, which in turn is a division of application Ser. No. 07/651,936, filed Feb. 7, 1991, now U.S. Pat. No. 5,190,983.

BACKGROUND OF THE INVENTION

1. Field of the Invention

The present invention relates to hollow particles of crosslinked melamine resin having a uniform particle diameter and to a process for producing the same. The hollow particles are useful as an organic filler.

2. Description of the Prior Art

Hollow particles of acrylic resin are known as shown in "Koubunshi Mikuro-shashinshu, Me de miru koubunshi" (Microphotographs of polymers—visualized polymers), vol. 1, p. 107–108, compiled by Koubunshi Gakkai (Society of Polymer Science), published by Baifukan. However, they are inferior in heat resistance to those of thermosetting resin and hence they are not suitable for use in the application area where heat treatment (such as heat drying) is required.

There are known porous particles of thermosetting resin as disclosed in Japanese Patent Publication No. Sho 63-20455 (20455/1988) and Japanese Patent Laid-open No. Sho 50-122564 (122564/1975). However, there are not known hollow particles of crosslinked thermosetting resin having a uniform particle diameter exist similar products such as microcapsules for pressure-sensitive paper, they need a complex process and present difficulties in keeping the particle diameter uniform.

In addition, there are available solid particles of crosslinked resin having a uniform diameter. However, they are poor as a heat-insulating filler. Moreover, as compared with inorganic pigments, they are also poor as an opacifying pigment to be added to paper or paint because of its refractive index close to that of paper or paint.

SUMMARY OF THE INVENTION

In order to address the above-mentioned problems, thereby to produce hollow particles of crosslinked melamine resin having a uniform diameter, the present inventors carried out extensive studies. An object of the present invention is to provide a process which comprises subjecting a water-soluble melamine-formaldehyde-methanol precondensate to condensation reaction in the presence of a curing catalyst such as an organic acid in an aqueous solution containing a water-soluble polymer with carboxyl groups or a water-soluble copolymer of ethylenically unsaturated carboxylic acid monomer, until the reaction liquid becomes turbid due to the formation of particles, adding to the reaction mixture a solvent or substance which dissolves or swells the melamine resin condensate forming the particles, with or without dilution with a reactive solvent after the addition of the solvent or substance, and continuing the reaction until the completion of the reaction.

In other words, the present invention was completed on the basis of findings that the hollow particles of crosslinked melamine resin having a uniform diameter can be obtained in two steps. In the first step, a melamine-formaldehyde precondensate which has been methyl-etherified more than 10% with methanol undergoes condensation at a certain reaction rate by the aid of a readily available protective colloid selected from carboxyl group containing polymers such as a copolymer of acrylamide or methacrylamide with acrylic acid or methacrylic acid, a partial hydrolyzate of acrylamide and/or methacrylamide, and a saponified product of acrylonitrile. This protective colloid contributes to the formation of particles having a uniform particle diameter. In the second step, the reaction mixture is given a solvent or substance which dissolves or swells the melamine resin condensate constituting the particles, and if necessary, the reaction mixture is subsequently diluted with a reactive solvent, so that the particles are made hollow.

EFFECT OF THE INVENTION

Thus, according to the present invention, hollow particles of crosslinked melamine resin having a uniform particle diameter can be provided. They do not dissolve and swell in alcohols such as methanol and ethanol, and organic solvents such as xylene, toluene, ethyl acetate, and acetone. In addition, they do not melt and stick during heat treatment at 200° C. Because of these characteristic properties, they will find use as a light weight, inexpensive organic filler in various application areas.

Figure 1:
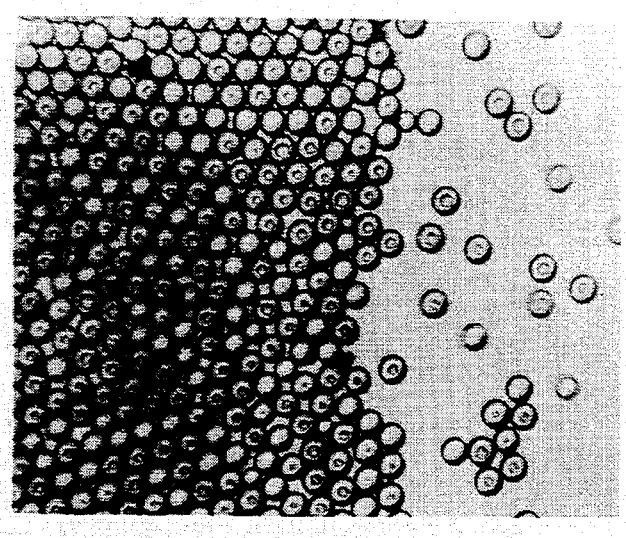
FIG. 1 is a micrograph showing the structure of the hollow particles of crosslinked melamine resin obtained in Example 1.

These micrographs (×400) were taken using a differential interference microscope (BH-2, made by Olympus Co., Ltd.) which creates a three-dimensional image.

DETAILED DESCRIPTION OF THE INVENTION

According to the present invention, the hollow particles of crosslinked melamine resin having a uniform diameter are produced in the following manner. First, a precondensate of methyl-etherified melamine resin undergoes condensation reaction to give particles of crosslinked melamine resin having a uniform diameter. The condensation reaction is performed in an aqueous solution adjusted to a certain pH at 20°–70° C. While the crosslinking reaction for the melamine resin constituting the particles does not proceed too far, the reaction mixture is given a solvent or substance which dissolves or swells the crosslinked melamine resin condensate constituting the particles, so that the particles are made hollow. If necessary, the reaction mixture is further diluted with a reactive solvent and the crosslinking reaction is continued while the particles are kept hollow. The precondensate is one which is readily available and commonly used as a fiber treatment or paper reinforcer. The aqueous solution contains a copolymer of acrylamide or methacrylamide with acrylic acid or methacrylic acid, a partial hydrolyzate of acrylamide or methacrylamide, or a saponified product of acrylonitrile, which are commonly used as a polymeric flocculating agent or internal paper reinforcer. The pH adjustment is accomplished by an organic acid such as acetic acid, oxalic acid, formic acid, and paratoluenesulfonic acid, or an inorganic acid such as sulfuric acid and hydrochloric acid, which functions as a curing agent. The preferred pH is in the ranges of 5 to 8. The reaction temperature is easy to attain.

As mentioned above, the process of the present invention employs a water-soluble melamine-formaldehyde-methanol precondensate. It may be a commercially available methyl etherified melamine resin used for fiber treatment as explained above. It may also be a water-soluble precondensate obtained in the usual way which has a degree of methyl etherification higher than 10% which is defined as the ratio (%) of the number of methyl ether groups to the total amount of the number of methylol groups formed by the reaction of melamine and formaldehyde, methyl ether groups formed by the reaction of methylol group with methanol, and unreacted amino groups in melamine. The degree of methyl etherification is determined by $^{13}$C-NMR according to the procedure reported by B. Tomita and H. Ono, J. Polym. Sci. Polym. Chem. Ed., 17, 3205 (1979). With a precondensate which is not methyl etherified or has a degree of methyl etherification lower than 10%, it is difficult to produce particles having a uniform particle diameter because of the excessively fast condensation reaction and it is even impossible to make the particles hollow. Incidentally, formaldehyde may be used in the form of formalin, trioxane, or paraformaldehyde which generates formaldehyde.

The process of the present invention employs, as a protective colloid, a water-soluble copolymer of ethylenically unsaturated carboxylic acid monomer, a preferred example of which is a copolymer of acrylic acid or methacrylic acid or a sodium salt thereof with acrylamide or methacrylamide. The copolymer may contain additional comonomers, e.g., vinyl monomer (other than the above-mentioned monomers) in an amount not harmful to its water solubility. Examples of such comonomers include maleic acid, vinylsulfonic acid, itaconic acid, or a salt thereof, N-methylolacrylamide, hydroxyethyl acrylate, and vinylpyrrolidone, which give rise to water-soluble polymers, and styrene, acrylo-nitrile, and methyl methacrylate, which give rise to water-insoluble polymers. However, the above-specified water-soluble copolymer cannot be replaced by a carboxyl group-free polymer such as acrylamide homopolymer and methacrylamide homopolymer or a commonly used water-soluble polymer such as polyvinyl alcohol and CMC). They will not help produce the particles of crosslinked melamine resin having uniform particle diameter but they will cause agglomeration or stick to the reactor wall during reaction, giving rise to coarse irregular particles. The protective colloid should be used in an amount of 0.01-30 parts by weight, preferably 0.1-5 parts by weight, for 100 parts by weight of the water-soluble melamine-formaldehyde-methanol precondesate. With an amount in excess of 30 parts by weight, the protective colloid cannot be uniformly mixed with reactants by simple stirring. Incidentally, the protective colloid may be used in the form of previously prepared aqueous solution.

The process of the present invention employs, as a curing catalyst, an acid which includes carboxylic acids such as oxalic acid, formic acid, acetic acid, succinic acid, malic acid, citric acid, and tartaric acid, and ammonium salts thereof, sulfonic acids such as paratoluenesulfonic acid and metaxylenesulfonic acid, and inorganic acids such as hydrochloric acid, sulfuric acid, and nitric acid, and ammonium salts thereof. Preferable among them are carboxylic acids such as oxalic acid, formic acid, and acetic acid, which permits the easy pH adjustment of the aqueous solution. They should preferably be used in the form of previously prepared aqueous solution. The carboxylic acids may be used in combination with other acids or ammonium salts thereof.

The process of the present invention should be performed at pH 5-8. When the pH is less than 5.0, the reaction proceeds too fast to give particles having a uniform diameter and to make the particles hollow. When the pH is more than 8.0, the reaction is too slow to give the desired hollow particles at a reasonable cost in a simple manner. The process of the present invention should be performed at 20°-70° C., preferably 40°-60° C. With a temperature lower than 20° C., the reaction is too slow to give the desired particles within a reasonable period of time. With a temperature higher than 70° C., the reaction proceeds too fast to give particles having a uniform diameter and to make the particles hollow.

The process of the present invention should be performed in water as a solvent. Other solvents than water that can be used include water-miscible solvents such as methanol, ethanol, diethylene glycol, and glycerin. Even though these organic solvents are merely present when the reaction starts, they do not make particles hollow; but the above-mentioned steps are necessary to make particles hollow.

The invention will be described in more detail with reference to the following examples.

EXAMPLE 1

In a four-neck flask equipped with a stirrer, reflux condenser, thermometer, and nitrogen blow inlet were placed 1275 parts by weight of water, 75 parts by weight of methacrylic acid, 150 parts by weight of acrylamide, and 96 parts by weight of 25% NaOH aqueous solution. The reactants were stirred for 30 minutes with nitrogen gas blowing. Then, the temperature of the reaction mixture was raised to 35° C. and ammonium persulfate and sodium hydrogen sulfite as polymerization initiators were added, and polymerization was carried out for a prescribed period of time. Thus there was obtained a copolymer in the form of a clear viscous aqueous solution which contained 16% evaporation residue after treatment at 105° C. for 3 hours.

In a four-neck flask equipped with a simple stirrer, reflux condenser, and thermometer were placed 6.5 parts by weight of the copolymer aqueous solution, 395 parts by weight of water, and 200 parts by weight of methyl etherified melamine resin for fiber treatment (ML-725, containing 73% solids and having a degree of methyl etherification of about 50%, made by Honen Corporation). After mild stirring at 50–100 rpm, the resulting aqueous solution was adjusted to pH 5.8 with 1.4 ml of 50% aqueous solution of acetic acid. With the temperature raised to 60° C., reaction was carried out. Ten minutes later, the reaction liquid became turbid due to the formation of particles of crosslinked melamine resin having a uniform particle diameter. After continued reaction for 20 minutes, there were added 200 parts by weight of methanol and 400 parts by weight of water. Reaction was continued at 60° C. Thus there was obtained a suspension of hollow particles of crosslinked melamine resin. The hollow particles had the structure as shown by a micrograph in FIG. 1.

EXAMPLE 2

Figure 2:
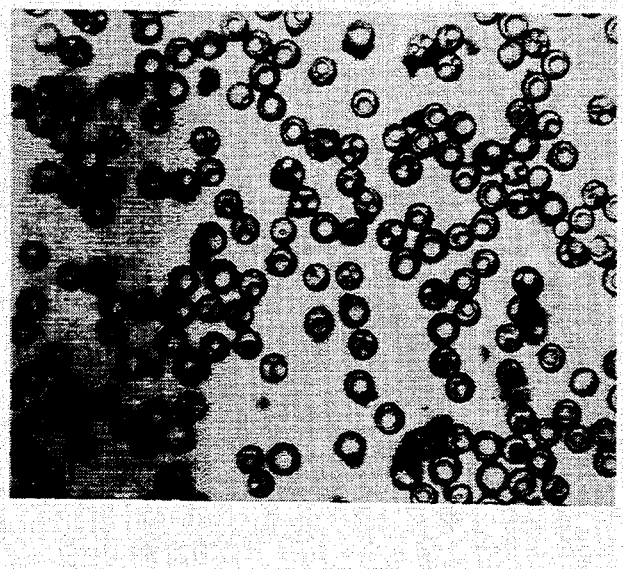
FIG. 2 is a micrograph showing the structure of the hollow particles of crosslinked melamine resin obtained in Example 2.

The procedure for reaction in Example 1 was repeated except that the melamine resin (ML-725 made by Honen Corporation) was replaced by 200 parts by weight of a melamine resin containing 80% solids and having a degree of methyl etherification of about 35% prepared by the process mentioned in "Polymer Experiments", vol. 5, "Polycondensation and Polyaddition", p. 490–491, compiled by S. Kanbara (published by Kyoritsu Shuppan). After reaction at 60° C. for 10 minutes, the reaction liquid became turbid. After continued reaction for 30 minutes, there were added 250 parts by weight of glycerin and 350 parts by weight of water. Reaction was continued at 60° C. Thus there was obtained a suspension of hollow particles of crosslinked melamine resin. The hollow particles had the structure as shown by a micrograph in FIG. 2.

EXAMPLE 3

Figure 3:
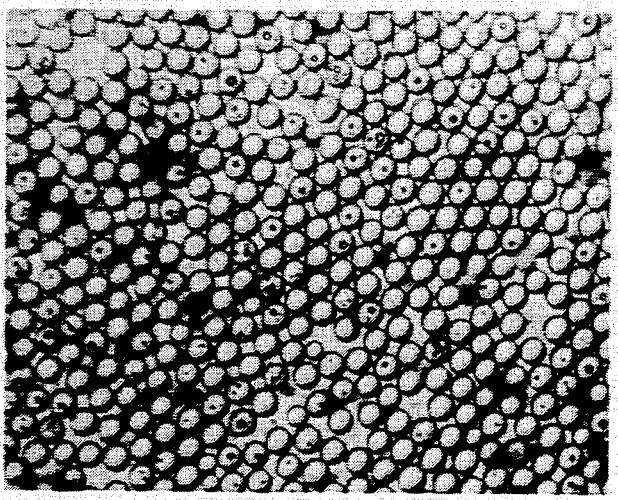
FIG. 3 is a micrograph showing the structure of the hollow particles of crosslinked melamine resin obtained in Example 3.

The procedure for reaction in Example 1 was repeated by charging 6.5 parts by weight of the copolymer aqueous solution, 200 parts by weight of melamine resin (ML-725, made by Honen Corporation), and 390 parts by weight of water. The resulting aqueous solution was adjusted to pH 6.5 with 10% oxalic acid solution. After reaction at 60° C. for 15 minutes, the reaction liquid became turbid. Thirty minutes later, 200 parts by weight of glycerin was added and reaction was continued at 60° C. Thus there was obtained a suspension of hollow particles of crosslinked melamine resin. The hollow particles had the structure as shown by a micrograph in FIG. 3.

COMPARATIVE EXAMPLE 1

Reaction was carried out in the same manner as in Example 1 except that the aqueous solution of copolymer was replaced by 20 parts by weight of 10 wt % aqueous solution of acrylamide homopolymer. In the middle of the reaction, agglomeration took place, eventually giving rise to a single lump.

COMPARATIVE EXAMPLE 2

Reaction was carried out in the same manner as in Example 1 except that the melamine resin (ML-725, made by Honen Corporation) was replaced by a melamine-formaldehyde-water precondensate containing 50% solids and having a degree of etherification of 0%. The reaction gave rise to particles of crosslinked resin having uneven particle diameters, with a broad distribution from 1 to 100 um. The particles were not hollow but solid.

COMPARATIVE EXAMPLE 3

Reaction was carried out in the same manner as in Example 3 except that the aqueous solution of copolymer was replaced by 10% aqueous solution of commercial polyvinyl alcohol (PVA-217, made by Kuraray Co., Ltd.). The reaction gave rise to some agglomerates as well as particles having uneven particle diameters over a broad distribution. The particles contained very few hollow ones.

what is claimed:

1. Hollow particles of crosslinked melamine formaldehyde resin having a uniform particle diameter which are obtained by a process comprising subjecting a water-soluble melamine formaldehyde methanol precondensate to condensation reaction in the presence of a curing catalyst, said curing catalyst comprised of an organic acid, in an aqueous solution containing a water-soluble polymer with carboxyl groups or a water-soluble copolymer of ethylenically unsaturated carboxylic acid monomer, until the reaction liquid becomes turbid due to the formation of particles; adding to the reaction mixture a solvent or substance which dissolves or swells the melamine resin condensate forming the particles; optionally diluting the mixture with a reactive solvent after the addition of the solvent or substance; and allowing the reaction to go to completion.

2. Hollow particles of crosslinked melamine formaldehyde resin according to claim 1, wherein the condensation reaction for water-soluble melamine-formaldehyde-methanol precondensate is carried out at 20°–70° C. in an aqueous solution containing a water-soluble polymer with carboxyl groups or a water-soluble copolymer of ethylenically unsaturated carboxylic acid monomer, said aqueous solution being adjusted to pH 5–8 with a curing catalyst such as an organic acid, and the solvent or substance which dissolves or swells the melamine resin condensate forming the particles is added within at least 1 hour after the reaction liquid has been turbid due to the formation of particles, with or without diluting the mixture with a reactive solvent after the addition of the solvent or substance, thereby making the particles hollow.

3. Hollow particles of crosslinked melamine formaldehyde resin according to claim 1, wherein the water-soluble precondensate is a melamine-formaldehyde precondensate in which the ratio of methyl etherification is higher than 10%.

4. Hollow particles of crosslinked melamine formaldehyde resin according to claim 1, wherein the water-soluble polymer with carboxyl groups is a partial hydrolyzate of acrylamide and/or methacrylamide polymer or a saponified product of acrylonitrile polymer.

5. Hollow particles of crosslinked melamine resin according to claim 1, wherein the water-soluble copolymer of ethylenically unsaturated carboxylic acid monomer is a copolymer of acrylic acid and/or methacrylic acid or a sodium salt thereof with acrylamide and/or methacrylamide.

6. Hollow particles of crosslinked melamine formaldehyde resin according to claim 1, wherein the solvent or substance which dissolves or swells the melamine resin condensate is an alcohol such as methanol, ethanol, and butanol, a glycol such as diethylene glycol and glycerin, or a melamine-formaldehyde precondensate in which the ratio of methyl etherification is higher than 10%.

* * * * *